United States Patent
Kang

(10) Patent No.: US 9,104,681 B2
(45) Date of Patent: Aug. 11, 2015

(54) SOCIAL NETWORK SERVICE SYSTEM AND METHOD FOR RECOMMENDING FRIEND OF FRIEND BASED ON INTIMACY BETWEEN USERS

(71) Applicant: NHN Corporation, Seongnam-si (KR)

(72) Inventor: Ho Sung Kang, Seongnam-si (KR)

(73) Assignee: NHN Corporation, Gyeonggi-Do (KR)

( * ) Notice: Subject to any disclaimer, the term of this patent is extended or adjusted under 35 U.S.C. 154(b) by 232 days.

(21) Appl. No.: 13/727,075

(22) Filed: Dec. 26, 2012

(65) Prior Publication Data

US 2013/0166574 A1    Jun. 27, 2013

(30) Foreign Application Priority Data

Dec. 27, 2011 (KR) .......... 10-2011-0143617
Jun. 14, 2012 (KR) .......... 10-2012-0063775

(51) Int. Cl.
*G06F 15/16* (2006.01)
*G06F 17/30* (2006.01)
*G06Q 50/00* (2012.01)
*G06Q 30/02* (2012.01)

(52) U.S. Cl.
CPC .......... *G06F 17/30115* (2013.01); *G06Q 30/02* (2013.01); *G06Q 50/01* (2013.01)

(58) Field of Classification Search
CPC .......... G06F 17/30247; G06F 17/3089; G06F 17/30563; G06F 17/30115; G06Q 50/01; G06Q 30/02

See application file for complete search history.

(56) References Cited

U.S. PATENT DOCUMENTS

| | | | |
|---|---|---|---|
| 2009/0222404 A1* | 9/2009 | Dolin et al. | 707/2 |
| 2010/0095343 A1* | 4/2010 | Kaihotsu | 725/118 |
| 2011/0282952 A1* | 11/2011 | Song | 709/206 |
| 2012/0011340 A1* | 1/2012 | Flynn et al. | 711/171 |
| 2012/0143921 A1* | 6/2012 | Wilson et al. | 707/798 |
| 2012/0278094 A1* | 11/2012 | Kovacevic et al. | 705/2 |

FOREIGN PATENT DOCUMENTS

| | | | |
|---|---|---|---|
| KR | 2003-0056701 A | 7/2003 | |
| KR | 2009-0025295 A | 3/2009 | |
| KR | 2010-0109847 A | 10/2010 | |
| KR | 2010-0130003 A | 12/2010 | |

* cited by examiner

*Primary Examiner* — Tarek Chbouki
(74) *Attorney, Agent, or Firm* — Harness, Dickey & Pierce, P.L.C.

(57) ABSTRACT

A social network service (SNS) system and method for recommending a friend of a friend based on an intimacy between users are provided. The SNS system includes an extracting unit to extract communication information from each of a friend relationship between a user and a first-group friend and a friend relationship between the user and a second-group friend. The system also includes a calculating unit to calculate an intimacy of each of the friend relationships based on the extracted communication information. The system includes a generating unit to generate a list of recommended second-group friends based on the calculated intimacy.

2 Claims, 12 Drawing Sheets

FIG. 7

|  | Relational | Graph (All) | Graph (Top 150) |
|---|---|---|---|
| Response Time | 5.9 sec  40X↑ | 0.15 sec  300X↑ | 0.0005 sec |

FIG. 8

|  | All |  | Top 150 |
|---|---|---|---|
| Result Count | 9,060,712 | 99% ↓ | 14,912 |
| Memory | 900 MB | 32% ↓ | 608 MB |
| Load Time | 37.1 sec | 23% ↓ | 28.8 sec |

SOCIAL NETWORK SERVICE SYSTEM AND METHOD FOR RECOMMENDING FRIEND OF FRIEND BASED ON INTIMACY BETWEEN USERS

CROSS-REFERENCE TO RELATED APPLICATIONS

This application claims priority to and the benefit of Korean Patent Application No. 10-2011-0143617, filed on Dec. 27, 2011, and Korean Patent Application No. 10-2012-0063775, filed on Jun. 14, 2012, which are hereby incorporated by reference for all purposes as if fully set forth herein.

BACKGROUND OF THE INVENTION

1. Field of the Invention

Exemplary embodiments of the present invention relate to a social network service (SNS) system and method for recommending a friend of a friend based on an intimacy between users.

2. Discussion of the Background

Typically, a friend recommendation function of a social network service (SNS) is used to assist a user to make a new friend, and to provide a service to a user with a number of friends. In a conventional system, when a friend of a user is defined to be a first-group friend, and when a friend of the first-group friend is defined to be a second-group friend of the user, recommending merely the second-group friend to the user (that is, a scheme of recommending a friend of a friend) is provided.

For example, when users A and B are assumed to be friends (F(A, B)=True), and a mutual friend count of users A and C is assumed to be represented by 'M.F.C(A, C),' a set of friends recommended to the user A may be defined to be a set of users C who are friends of the user B, but are not friends of the user A (F(A, B)=True and F(B, C)=True and F(A, C)=not True). In this instance, conventionally, sets of recommended friends may be arranged in an order of 'M.F.C(A, C)' for each of the set of users C. Additionally, friends may be recommended to the user A in the order of 'M.F.C(A, C),' or friends corresponding to 'M.F.C(A, C)' equal to or greater than a predetermined value.

However, in conventional schemes of recommending a second-group friend to a user, a recommendation priority is determined based on only a number of mutual friends between the user and the second-group friend, that is, merely based on the mutual friend count, and accordingly, it is difficult to reflect important factors for recommending friends to a user because the conventional scheme may not consider an actual relationship between the user and the second-group friend. For example, even assuming the conventional scheme determines a number of mutual friends (e.g., 100 mutual friends) between the specific user and the second-group friend, they may not know each other. In other words, the conventional scheme using the mutual friend count may not represent how the two users are related to each other.

Therefore, there is a need for an approach for effectively recommending a friend in a Social Networking Service (SNS).

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a social network service (SNS) system and method for providing a service including recommending friends to users by calculating an intimate relation among users based on communication information. The communication information, for example, includes a period of time in which a friend relationship is retained, or a number of interactions, such as a number of posting comments or a number of agreements to postings of other users. Based on the calculation of the intimate relations among users, exemplary embodiments of the present invention are capable of providing an enhanced social networking service by facilitating building of social networks among users.

Additional features of the invention will be set forth in the description which follows, and in part will be apparent from the description, or may be learned by practice of the invention.

Exemplary embodiments of the present invention provide a system. The system includes an extracting unit to extract communication information from indicative relationship between a user and a first-group friend and indicative relationship between the first-group friend and a second-group friend. The system also includes a calculating unit to calculate an intimacy of each of the friend relationships based on the extracted communication information. The system includes a generating unit to generate a list of recommendable second-group friends based on the calculated intimacy.

Exemplary embodiments of the present invention provide a method. The method includes extracting communication information from indicative relationship between a user and a first-group friend and indicative relationship between the first-group friend and a second-group friend. The method also includes calculating an intimacy of each of the friend relationships based on the extracted communication information. The method includes generating a list of recommended second-group friends based on the calculated intimacy.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a table illustrating a result obtained by comparing performance of a relational model, performance of a first graph model and performance of a second graph model that is based on a predetermined number of friends according to exemplary embodiments of the present invention.

FIG. 8 is a table illustrating a result obtained by comparing performance of a first graph model showing all recommended friends with performance of a second graph model showing a set number of recommended friends according to exemplary embodiments of the present invention.

DETAILED DESCRIPTION OF THE ILLUSTRATED EMBODIMENTS

Figure 1:
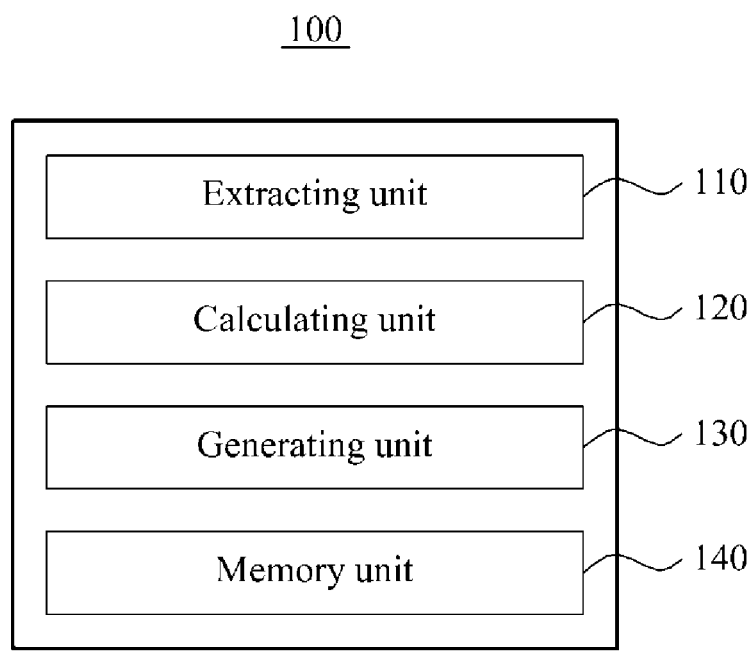
FIG. 1 is a block diagram illustrating an internal configuration of a social network service (SNS) system according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of the present invention relate to a social network service (SNS) system and method that facilitate building of social networks or social relations among users, thus providing users to form more personal connections, by recommending a friend of a friend of users to link in an SNS. Hereinafter, the friend of a specific user may be referred to as a 'first-group friend,' and the friend of the friend of the specific user may be referred to as a 'second-group friend.'

In a social networking service, the second-group friend having a high intimacy with the first-group friend having a high intimacy with the specific user may be preferentially recommended to the specific user.

In a scheme of recommending a friend of a friend, namely recommending a second-group friend to a specific user, a recommendation priority is determined based on only a number of mutual friends between the specific user and the second-group friend (based on a mutual friend count). Exemplary embodiments of the present invention, a weight may be given to a closer friend based on an intimacy, similarly to a real life, by reflecting numerical values of the intimacy in a friend relationship.

FIG. 1 is a block diagram illustrating an internal configuration of an SNS system 100 according to exemplary embodiments of the present invention. As shown in FIG. 1, the SNS system 100 may include an extracting unit 110, a calculating unit 120, and a generating unit 130.

The extracting unit 110 may extract communication information from a friend relationship between a user and a first-group friend, and may extract communication information from a friend relationship between the first-group friend and a second-group friend.

The communication information may include at least one of interaction information and a period of time in which a friend relationship is retained. The interaction information may include, for example, a number of comments or a number of agreements. The interaction information may indicate an interaction occurring in a friend relationship, and may be determined based on a number of at least one action. For example, the interaction information may be determined based on at least one of a number of times of posting comments, a number of times of agreeing to another user's posting, and a number of times of occurrences of actions in social networks, such as setting an interest for making a friend by clicking accept on friend request.

The calculating unit 120 may calculate an intimacy of each of the friend relationships based on extracted communication information. In this instance, the calculating unit 120 may calculate an intimacy of the friend relationship between the user and the first-group friend, and an intimacy of a friend relationship between the first-group friend and the second-group friend.

Figure 2:
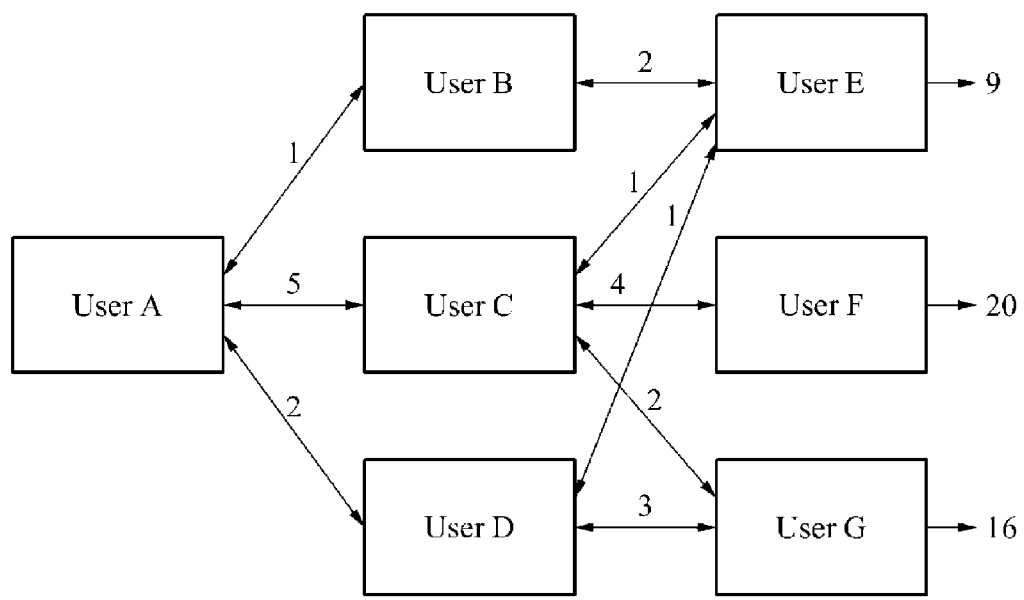
FIG. 2 is a diagram illustrating a friend relationship among users according to exemplary embodiments of the present invention.

FIG. 2 illustrates seven users, for example, users A to G according to exemplary embodiments of the present invention. The users B, C, D are first-group friends of the user A, and the users E, F, G are second-group friends that may be recommended to the user A. In FIG. 2, a bidirectional arrow connecting two users may indicate that a friend relationship between the two users is established, and a numeral on a bidirectional arrow may indicate an intimacy between two users connected by the bidirectional arrow.

The intimacy may be determined by measuring how many comments a user written to a post of another user, and how much the user agreed with the post of the other user. As a number of written comments and a number of agreements increase, a higher intimacy may be measured, and an operation may be performed on a released post.

As an example, an intimacy may be formed for a predetermined period of time immediately after a friend relationship is established. As days in which the friend relationship is established pass, the intimacy may be reduced. After a set date, the intimacy may be represented by '1.' For example, '1' may be used as a basic value indicating a friend relationship.

When an intimacy is calculated, a concept of equalizing existing intimacy values that remain may be introduced, to reduce a deviation of the intimacy. Accordingly, values for the last few days may be equalized and calculated. Hereinafter, a friend recommendation algorithm according to exemplary embodiments of the present invention will be described. For example, when users X and Y are assumed to be friends, that is, 'F(X, Y)=True,' and a mutual friend count of users X and Z is assumed to be 'M.F.C(X, Z),' a recommendation friend set of the user X may be defined to be a set of users Z, that is, 'F(X, Y) F(Y, Z).' Additionally, 'I(X, Y)' is assumed to be an intimacy of 'X→Y' (that is, a value indicating traffic from the user X to the user Y), an intimacy of the users Z with the user A may be calculated as shown in the following Equation 1:

$$\text{SCORE of } Z = \sum_{i=1}^{M,F,C(X,Z)} I(X, Y_i) * I(Y_i, Z) \quad \text{[Equation 1]}$$

In Equation 1, X denotes a user, Y, denotes a first-group friend, and Z denotes a second-group friend. For example, using Equation 1, an intimacy between the user A and second-group friends E, F, G of FIG. 2 may be obtained. A mutual friend count of the users A and E, that is, 'M.F.C(A, E)' may be '3,' a mutual friend count of the users A and F, that is, 'M.F.C(A, F)' may be '1,' and a mutual friend count of the users A and G, that is, 'M.F.C(A, G)' may be '2.' Accordingly, according to a conventional technology, since a friend is recommended based on a mutual friend count, the user E may be highly likely to be recommended to the user A. However, according to exemplary embodiments of the present invention, an intimacy between the users A and E, an intimacy between the users A and F, and an intimacy between the users A and G may be calculated using Equation 1 to be '1·2+5·1+2·1=9', '5·4=20', and '5·2+2·3=16,' respectively. Accordingly, unlike the mutual friend count, which is highest between users A and E, the intimacy between the users A and F has the highest value. Additionally, the intimacy calculated by the calculating unit 120 may be used through a computation and verification process. To reflect communication information that continues to vary, the intimacy may be transmitted to the extracting unit 110 by repeatedly passing through a feedback process.

Figure 3:
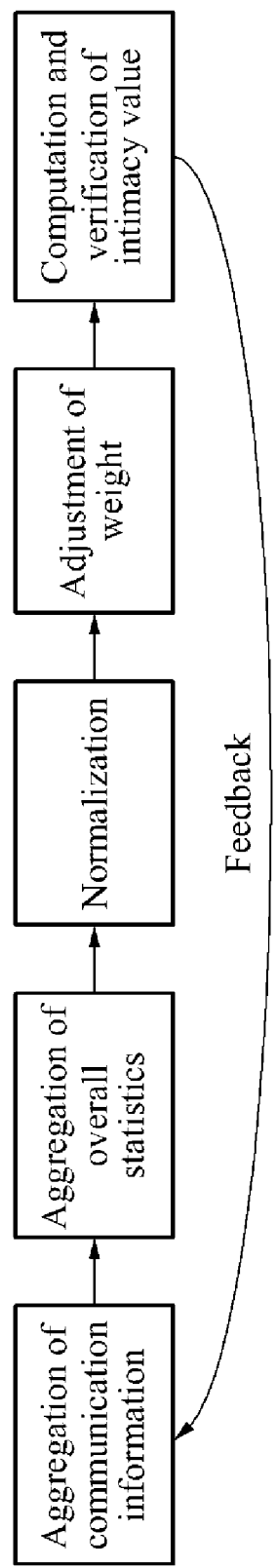
FIG. 3 is a diagram illustrating a process of computing an intimacy value according to exemplary embodiments of the present invention.

FIG. 3 is a diagram illustrating a process of computing an intimacy according to exemplary embodiments of the present invention. Since a variable extracted by the extracting unit 110 continues to vary, the overall statistics may be aggregated, and a numerical value may be normalized and adjusted to display the numerical value within a predetermined range. Additionally, a weight may be applied to the adjusted numerical value, and an intimacy value may be computed. The computed intimacy value may be calculated again through a predetermined verification process, and a feedback process may be repeated to reflect a numerical value that continues to vary. The variable may include, for example, a period of time in which a friend relationship is retained, an action of setting an interest for making a friend, an action of writing a comment, an action of agreeing to another user's message, for example, clicking 'me2' in Me2day of NHN Corporation or Twitter's retweet.

In a process of computing an intimacy, since an intimacy value may be biased during normalization of the intimacy value, either Equation 2 or 3 may be selected, and normalization may be performed.

$$I' = \frac{I - \min}{\max - \min}(\text{new\_max} - \text{new\_min}) + \text{new\_min} \quad \text{[Equation 2]}$$

$$I' = \frac{I - A}{\sigma} \quad \text{[Equation 3]}$$

In Equation 2, a maximum level and a minimum level of the intimacy may be used by a maximum-minimum normalization scheme. In Equation 3, a nonnormalized intimacy value, and an average value and a standard deviation of intimacy value may be used by a z-score normalization scheme. In Equations 2 and 3, I denotes an original intimacy value, I' denotes a normalized intimacy value, A denotes an average of intimacy values, and σ denotes a standard deviation of intimacy values.

Figure 4:
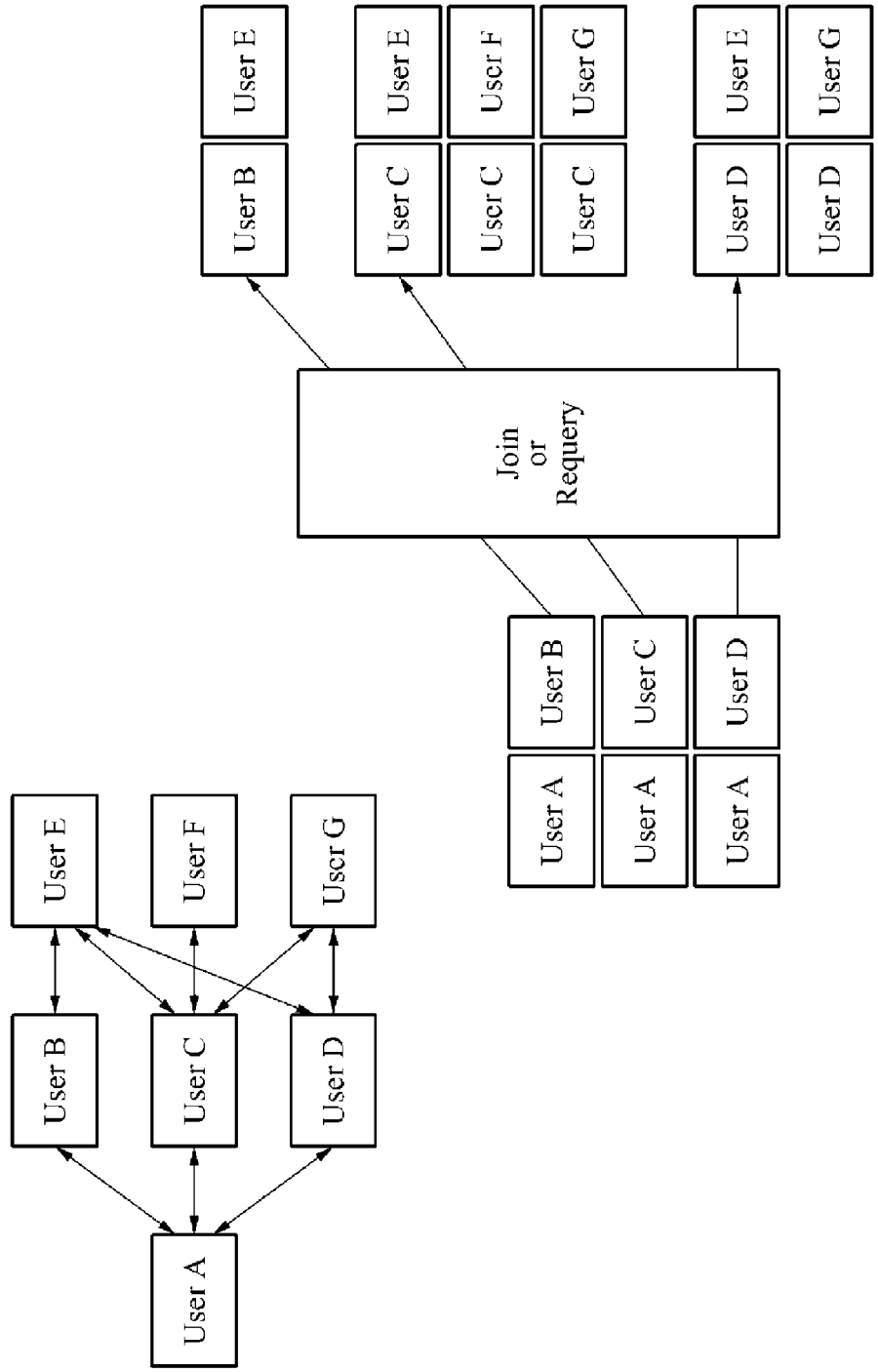
FIG. 4 is a diagram illustrating a data modeling structure that is applicable to an SNS system according to exemplary embodiments of the present invention.
Figure 5:
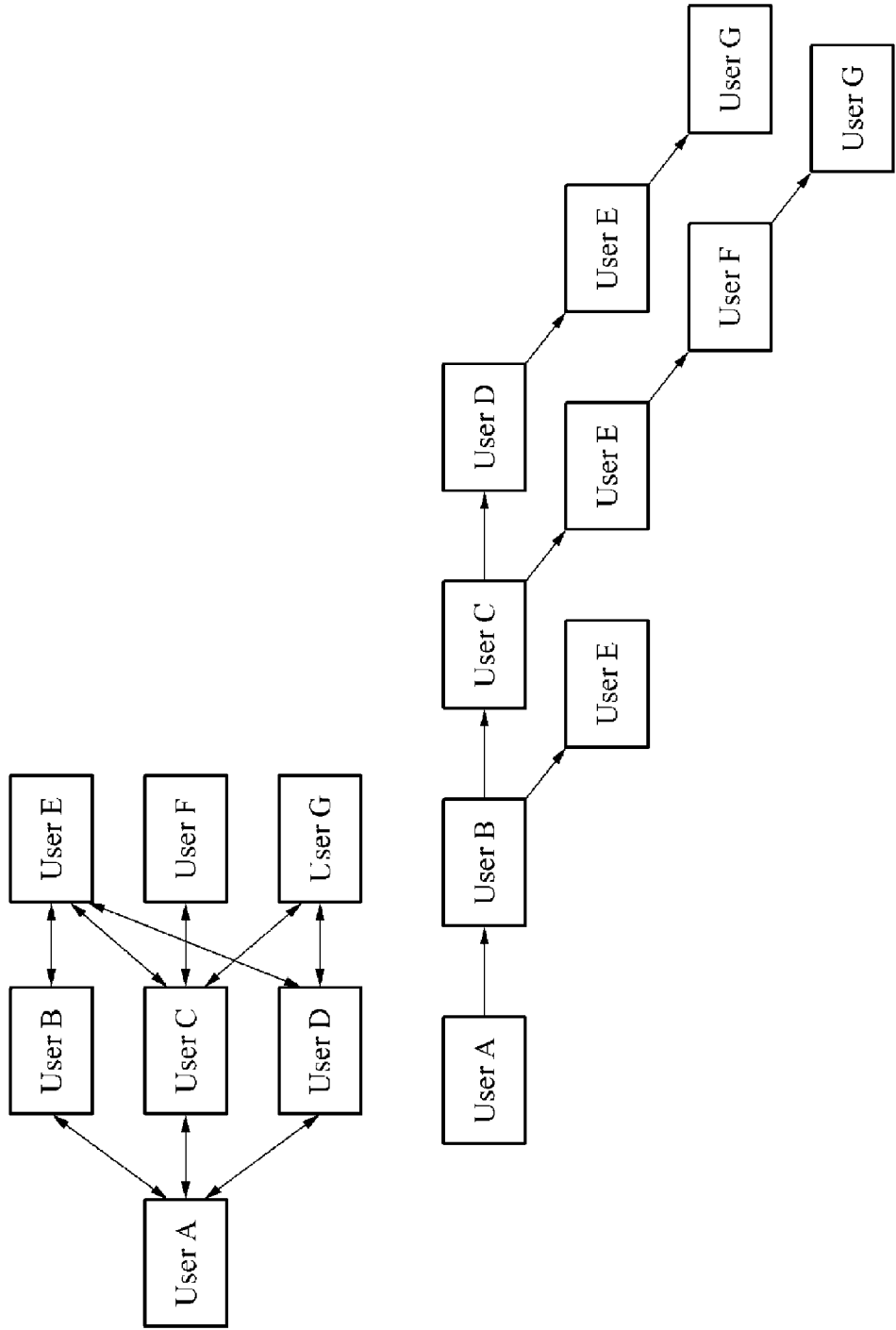
FIG. 5 is a diagram illustrating another data modeling structure that is applicable to an SNS system according to exemplary embodiments of the present invention.

FIGS. 4 and 5 are diagrams illustrating data modeling structures that are applicable to the SNS system 100 of FIG. 1. A data model suitable for an SNS may include, for example, a relational model, and a graph model. A modeling scheme of a relational model, and a modeling scheme of a graph model will be described with reference to FIGS. 4 and 5, respectively.

In the relational model of FIG. 4, a join operation, or a requery scheme may be performed so that a user may be connected to a first-group friend and a second-group friend in a one-to-one relationship. In the graph model of FIG. 5, a node may be formed based on a user of an SNS, and a query scheme of tracking a reference pointer indicating a friend relationship among users, and of acquiring desired data may be performed.

For example, to search for a friend of a friend of a user, data regarding the friend of the user, and data regarding the friend of the friend may be sequentially obtained. In this instance, overlapping data, or data regarding a friend that already has a relationship with the user may be removed.

To perform the above process, a join operation scheme and a requery scheme may be used. In the two schemes, processing may be similarly performed in the SNS system 100. When the requery scheme is performed a large number of times, or when the join operation scheme is performed, preprocessing and postprocessing may be additionally performed. Consequently, an operation amount may be increased. Actually, when the graph model is used, data may be processed more quickly, because an operation may be processed by a memory operation. Connection by a reference pointer may indicate that a node has a memory address of another node. For example, the memory operation may enable movement from a node to another node.

Figure 6:
FIG. 6 is a table illustrating a result obtained by comparing performance of a relational model with performance of a graph model according to exemplary embodiments of the present invention.

In an example, a table of FIG. 6 shows a result obtained by comparing performance of a structure of the relational model with performance of a structure of the graph model. The table of FIG. 6 shows a response time that is measured when an operation of searching for a second-group friend of a user having 250,000 friends is performed on each of the structure of the relational model and the structure of the graph model. As a result of the operation, '9,060,712' second-group friends are found, and 5.9 seconds (sec) and 0.15 sec are required to find the second-group friends in the relational model and the graph model, respectively. The relational model and the graph model are different from each other in the response time by about 40 times. In other words, it may be found that the graph model may respond more quickly than the relational model.

A characteristic of a product to which the graph model is applicable may be classified into various types, based on availability and performance. To increase availability of a system based on a scheme of implementing a specific product, a replication failover function may be performed. The replication failover function may enable data to be backed up in an alternative computer system, and enable the alternative computer system to be operated when the SNS system 100 is not available due to occurrence of a failure in the SNS system 100.

In the SNS system 100, the generating unit 130 may remove friends other than a predetermined number of recommended second-group friends based on the calculated intimacy, since a friend recommendation operation performance may be reduced by a user having an extremely large number of friends and the friends. Actually, as a number of people who use an SNS increases, a number of users each having an extremely large number of friends may also increase.

To prevent a reduction in performance caused by a user having a large number of friends, a scheme of recommending only a set number of friends in an order of intimacy may be used. The number of friends may be set based on the Dunbar's number. The Dunbar's number is suggested as a result of research of Robin Dunbar, professor of evolutionary anthropology, University of Oxford, and is derived from a theory stating that a human brain is capable of remembering about 150 people as close personal connections. In an exemplary embodiment of the present invention, the Dunbar's number may be used to set a number of recommended friends, and friends other than the recommended friends may be excluded from an operation.

FIG. 7 is a table showing a result obtained by comparing performance of a relational model, performance of a first graph model, and performance of a second graph mode, when a second-group friend of a user having 250,000 friends is searched for. In the second graph model, a number of friends set based on an intimacy among 250,000 friends is limited, for example, to 150 friends.

As shown in FIG. 7, the relational model and the first graph model are different from each other in response time by about 40 times, that is, the first graph model has excellent performance. When the number of friends is reduced from 250,000 to 150 in the same condition, a response time of the second graph model is about 0.0005 sec. In other words, performance of the second graph model is higher about 300 times than that of the first graph model.

More specifically, a first graph model may be compared with a second graph model in which a number of friends is set based on an intimacy. FIG. 8 shows a result count (that is, a number of friends of a found friend), a memory usage, and a load time, in an example in which an operation of searching for a friend of a friend is performed using the first graph model and the second graph model. As a result of comparison, the result count, the memory usage, and the load time of the second graph model are reduced by about 99%, by about 32%, and by about 23%, respectively, as shown in FIG. 8. Thus, performance of the SNS system 100 may be increased.

Due to rapid growth of services, the SNS system 100 may not store all personal connection information based on a friend relationship in a single server or a single memory. Actually, about 100 million people are registered in an SNS in the world, and accordingly a massive amount of data may be expected.

Figure 9:
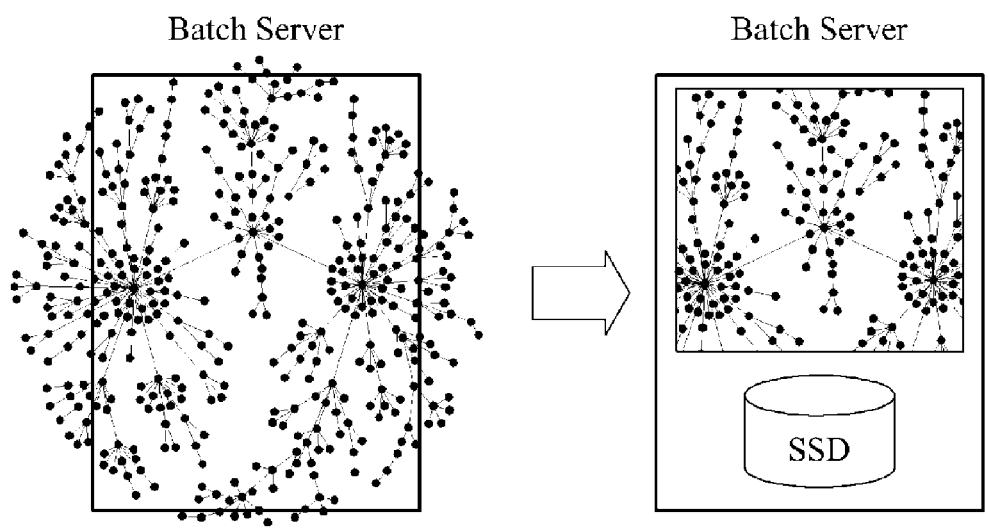
FIG. 9 is a diagram illustrating a scheme for extending an SNS system according to exemplary embodiments of the present invention.

Accordingly, to solve a problem of scalability of data storage of a system, the SNS system 100 may further include a memory unit 140 to store related data, and the memory unit 140 may include at least one memory. As shown in FIG. 9, data exceeding a capacity of a memory of the memory unit 140 may be stored in a separate semiconductor storage medium, for example, a solid state drive (SSD), and data may be maintained in the memory based on a cache algorithm. The cache algorithm may correspond to least recently used (LRU) or least frequently used (LFU), and data may be maintained in the memory, based on a frequency of use of the memory or whether the memory is recently used.

Figure 10:
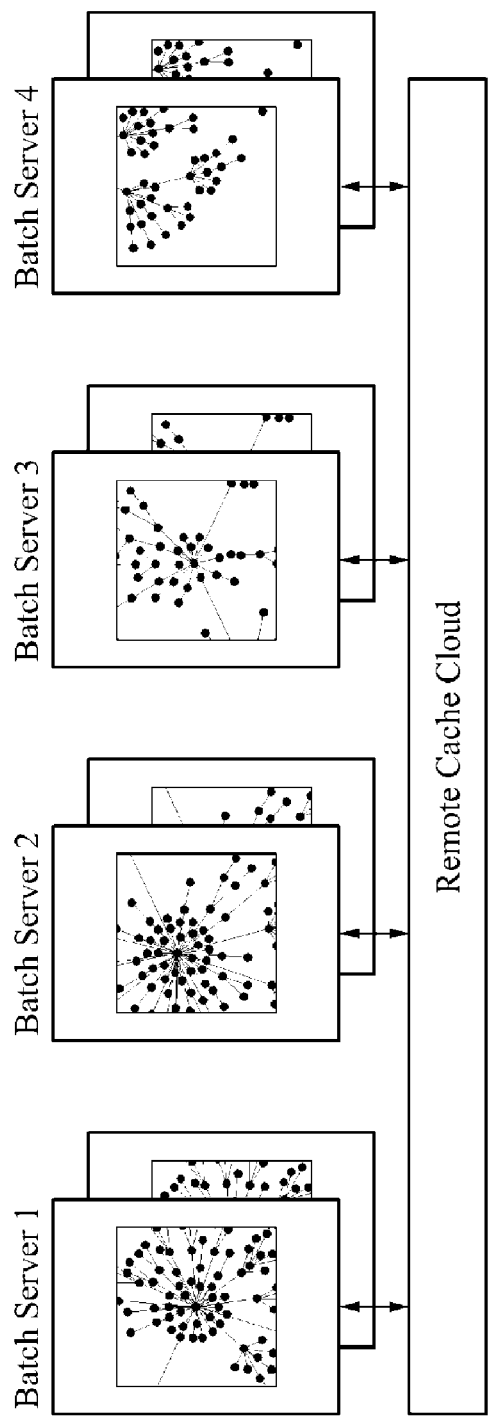
FIG. 10 is a diagram illustrating another scheme for extending an SNS system according to exemplary embodiments of the present invention.

Referring to FIG. 10, to solve a problem of scalability of data storage of a system, data may be distributed and stored in a memory of the memory unit 140 using a classification algorithm. When data is not found in a local memory, or when data does not exist, data may be used as a reference in a distributed memory through a remote cache cloud.

Figure 11:
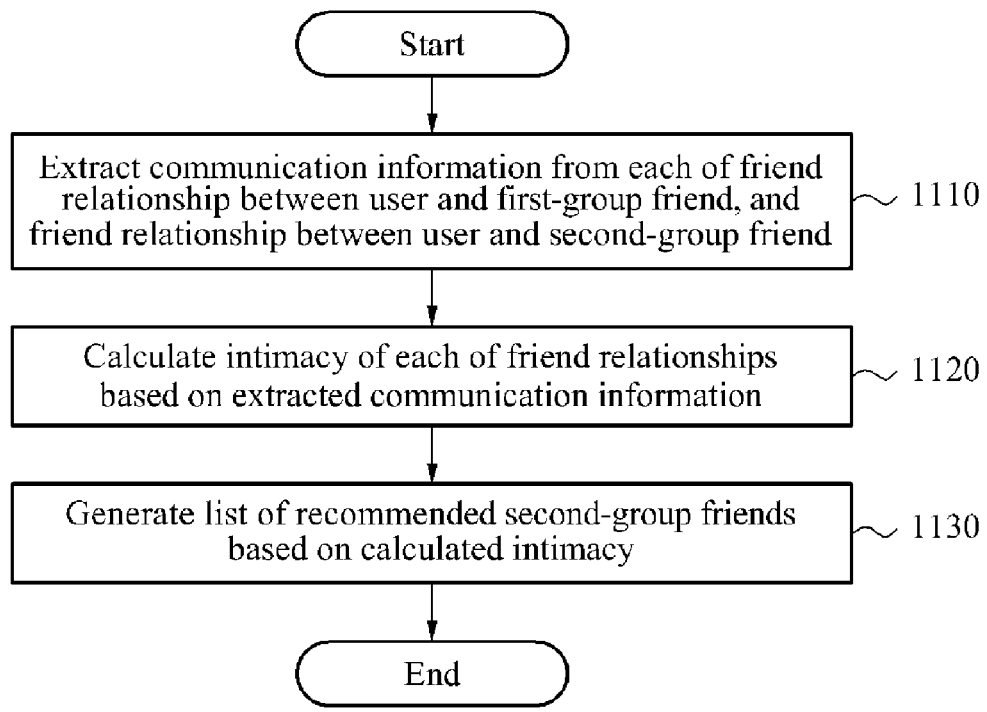
FIG. 11 is a flowchart of a process for illustrating an SNS method according to exemplary embodiments of the present invention.

FIG. 11 is a flowchart illustrating an SNS method according to exemplary embodiments of the present invention. The SNS method of FIG. 11 may be performed by the SNS system 100 of FIG. 1.

Referring to FIG. 11, in operation 1110, the SNS system 100 may extract communication information that is indicative of a relationship between a user and a first-group friend and communication information that is indicative of a relationship between the first group friend and a second-group friend. The communication information extracted in operation 1110 may include any type of information, which is accessible or acquirable by the SNS system 100 that may indicate the intimacy of the applicable friendship. For example, the extracted information may include at least one of interaction information and a period of time in which a friend relationship is retained. The interaction information may include, for example, at least one of a number of comments and a number of agreements. The interaction information may indicate an interaction occurring in different types of relations, and may be determined based on at least one of a number of actions.

In operation 1120, the SNS system 100 may calculate an intimacy of each of the different relations including friend relationships based on the communication information extracted in operation 1110.

In operation 1120, the SNS system 100 may calculate an intimacy of the friend relationship between the user and the first-group friend, and an intimacy of a friend relationship between the first-group friend and the second-group friend. Additionally, the SNS system 100 may obtain a value indicating traffic in each of the different relationships, and may use a multiplication of the obtained value to calculate an intimacy between the first-group friend and the second-group friend, so that the same intimacy value as a mutual friend count between the user and the second-group friend that may be recommended to the user may be obtained.

In addition, the calculated intimacy may be used through a computation and verification process. To reflect communication information that typically continues to vary, the calculated intimacy may be used in operation 1110 through a feedback process. When an intimacy value is computed and is completely verified through the feedback process, communication information may be aggregated again, and a new intimacy value may be computed.

In operation 1130, the SNS system 100 may generate a list of recommendable second-group friends based on the intimacy calculated in operation 1120.

In operation 1130, the SNS system 100 may remove friends other than a predetermined number of recommendable second-group friends based on the calculated intimate relations. A number of recommendable friends may be set based on the Dunbar's number, that is, 150 friends. The number of recommendable friends may be limited to '150,' to provide a user with a simple system by reducing an unnecessary list of recommendable friends, or to solve a problem of scalability of the SNS system 100.

As described above, according to embodiments of the present invention, an intimate relations among users may be calculated based on communication information, for example, at least one of a period of time in which a friend relationship is retained, and a number of interactions, such as a number of posting comments or a number of agreements to the other user's post. As such a friend of a friend may be recommended based on the calculated intimate relations. Thus, it is possible to recommend a friend of a friend based on an intimacy among users.

Additionally, according to exemplary embodiments of the present invention, it is possible to more efficiently acquire data in association with an SNS by implementing a data model that is suitable to a SNS system and that has a high response speed.

One of ordinary skill in the art would recognize that system and method for providing recommendable friends in a social network service may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 12.

Figure 12:
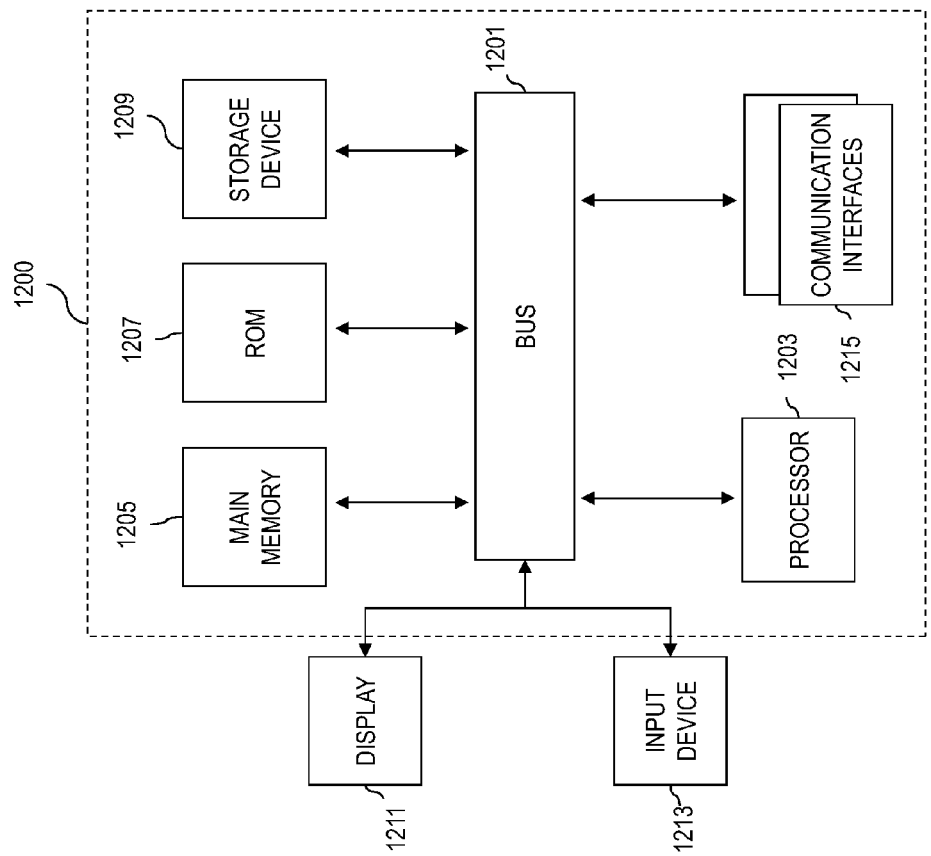
FIG. 12 is a diagram of hardware that can be used to implement exemplary embodiments of the present invention

FIG. 12 illustrates exemplary hardware upon which various embodiments of the invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled with the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may execute an application.

The term "computer-readable medium" or "storage device" as used herein refers to any medium that participates in providing instructions to the processor 1203 for execution. Such a medium may take many forms, including but not limited to non-volatile media, volatile media8. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, SSD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone or cable line. A modem of a local system receives the data on the telephone line and uses a wireless transmitter to convert the data to a signal and transmit the signal to a portable computing device, such as a personal digital assistant (PDA) or a laptop. A detector on the portable computing device receives the information and instructions borne by the signal and places the data on a bus. The bus conveys the data to main memory, from which a processor retrieves and executes the instructions. The instructions received by main memory can optionally be stored on storage device either before or after execution by processor. One or more units associated with a processor or computing device are configured to perform an operation of the exemplary embodiments. These units can be self-contained units or hardware components, such as an assembly of electronic components, a computing embedded system, a computer module, or computer software modules which can perform a defined task executable by the processor or the computing device and can be linked with other units or components to form a larger system.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A system for recommending a friend in a social network service, the system comprising:
a processor including an extracting unit configured to extract communication information indicative of a friend relationship between a user and a first-group friend and communication information indicative of a friend relationship between the first-group friend and a second-group friend;

the processor including a calculating unit configured to,
calculate an intimacy of each of the friend relationships based on the extracted communication information,
calculate an intimacy of the friend relationship between the user and the first-group friend and an intimacy of a friend relationship between the first-group friend and the second-group friend, and
the calculating unit is configured to calculate the intimacy for each of the friend relationships using the following Equation:

$$\text{SCORE of } Z = \sum_{i=1}^{M.F.C(X,Z)} I(X, Y_i) * I(Y_i, Z)$$

in which X denotes a user, Z denotes a second-group friend recommended to the user X, M.F.C(X, Z) denotes a mutual friend count of the user X and the second-group friend Z, $Y_i$ denotes a first-group friend, $I(X, Y_i)$ denotes an intimacy between the user X and the first-group friend $Y_i$, that is, a value indicating traffic, and $I(Y_i, Z)$ denotes an intimacy between the first-group friend $Y_i$ and the second-group friend Z,
wherein the calculating unit is configured to obtain a same intimacy value as the mutual friend count M.F.C(X, Z), and calculate an intimacy between the user X and the second-group friend Z; and
the processor includes a generating unit configured to generate a list of recommendable second-group friends based on the calculated intimacy by filtering friends in the second-group friends to remove friends having an intimacy level below a threshold level, and to provide the generated list to the user.

2. A method for recommending a friend in a social networking service (SNS), the method comprising:

extracting, by a processor, communication information indicative relationship between a user and a first-group friend and communication information indicative relationship between the first-group friend and a second-group friend;
calculating, by the processor, an intimacy of each of the friend relationships based on the extracted communication information;
calculating, by the processor, an intimacy of the friend relationship between the user and the first-group friend, and an intimacy of a friend relationship between the first-group friend and the second-group friend;
generating, by the processor, a list of recommended second-group friends based on the calculated intimacy by filtering friends in the second-group friends to remove friends having an intimacy level below a threshold level, and to provide the generated list to the user; and
providing, by the processor, the generated list to the user,
wherein the calculating the intimacy of each of the friend relationships includes calculating the intimacy for each of the friend relationships using the following Equation:

$$\text{SCORE of } Z = \sum_{i=1}^{M.F.C(X,Z)} I(X, Y_i) * I(Y_i, Z)$$

in which X denotes a user, Z denotes a second-group friend recommended to the user X, M.F.C(X, Z) denotes a mutual friend count of the user X and the second-group friend Z, $Y_i$ denotes a first-group friend, $I(X, Y_i)$ denotes an intimacy between the user X and the first-group friend $Y_i$, that is, a value indicating traffic, and $I(Y_i, Z)$ denotes an intimacy between the first-group friend $Y_i$ and the second-group friend Z,
wherein the calculating comprises obtaining a same intimacy value as the mutual friend count M.F.C(X, Z), and calculating an intimacy between the user X and the second-group friend Z.

* * * * *